E. C. BARTH.
COMBINED HOT WATER OR STEAM AND HOT AIR HEATER.
APPLICATION FILED MAY 21, 1914.
1,140,239.
Patented May 18, 1915.
2 SHEETS—SHEET 1.
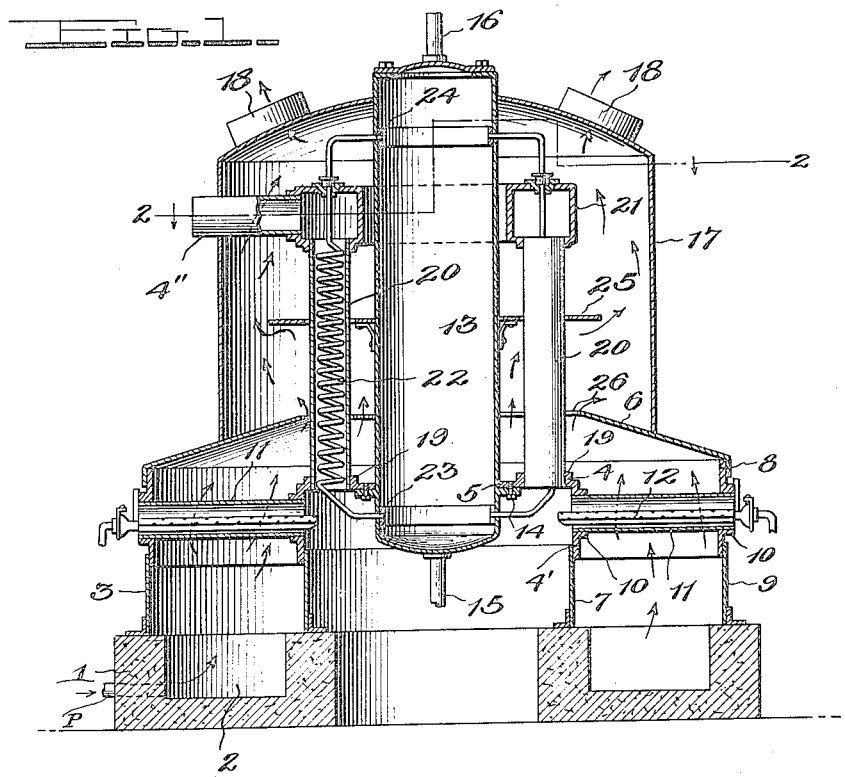
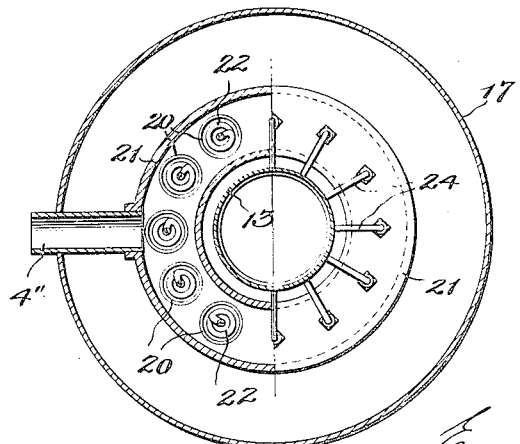
Witnesses
Inventor
Ernest C. Barth
By Joseph H. Miller
Attorney

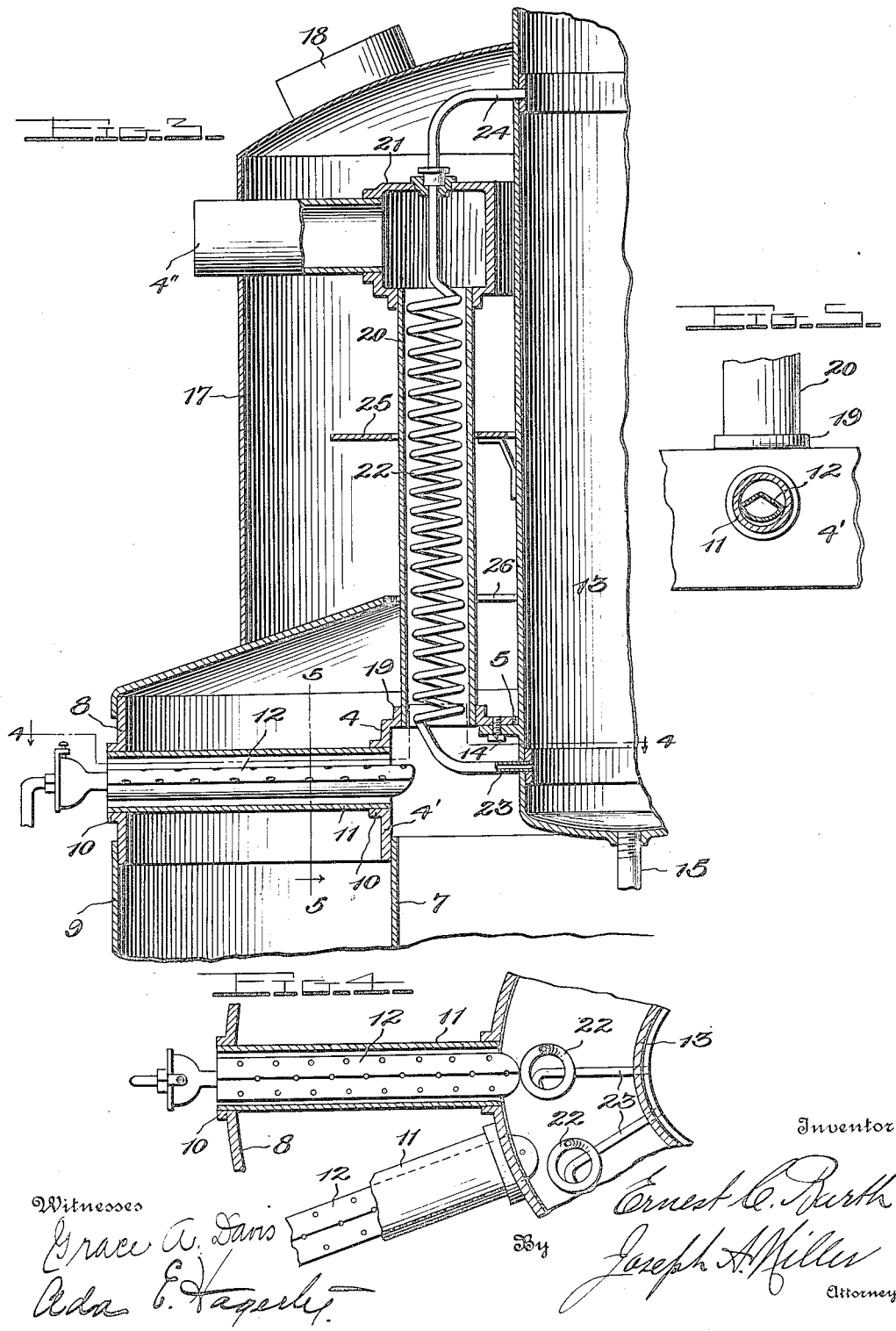

UNITED STATES PATENT OFFICE.

ERNEST C. BARTH, OF PROVIDENCE, RHODE ISLAND.

COMBINED HOT-WATER OR STEAM AND HOT-AIR HEATER.

1,140,239.　　　　　Specification of Letters Patent.　　Patented May 18, 1915.

Application filed May 21, 1914. Serial No. 840,076.

*To all whom it may concern:*

Be it known that I, ERNEST C. BARTH, a citizen of the United States, residing at Providence, in the county of Providence and State of Rhode Island, have invented a new and useful Improvement in Combined Hot-Water or Steam and Hot-Air Heaters, of which the following is a specification.

This invention relates to certain new and useful improvements in combined hot water or steam and hot air heaters, and the primary object thereof is to provide a heater of the type mentioned in which the parts are so related as to derive maximum heat for the purpose of heating the water to be used as hot water, or for conversion into steam, and for also heating air, so as to thus combine the two heating mediums and enable use of both for heating purposes, or to enable use of the hot water for cooking or bathing purposes.

A further object of the invention is to provide a heater in which the parts are compactly arranged and related so that they mutually contribute to derive maximum benefit from the heating media.

Still further the invention aims to provide a simple and economical structure which can be easily assembled and maintained in working condition.

In the drawings—Figure 1 is a central vertical sectional view of the invention. Fig. 2 is a sectional view taken on the line 2—2 of Fig. 1. Fig. 3 is an enlarged fragmentary view similar to Fig. 1. Fig. 4 is a section taken on the line 4—4 of Fig. 3, and Fig. 5 is a section taken on the line 5—5 of Fig. 3.

The invention includes a base structure 1 formed with a circular air box or chamber 2, the base being of ring-shape, as shown in Fig. 1 and being made of brick-work or cement. Mounted on the base 1 is a supporting element indicated generally by 3 and embodying spaced, inner and outer vertical rings 7 and 9, an inner top part 4 having a central opening 5, and a superposed top part 6, the top part 4 having a depending flange 4' which overlaps the inner ring 7, while the top part 6 overlaps a ring 8 which latter in turn, overlaps, the outer ring 9. The flange 4' and the ring 8 are formed with collars or bosses 10, which support tubes or casings 11 that are open-ended and within which the gas burners 12 are disposed. A water tank or drum 13 passes through the opening 5 of the top part 4, and has a peripheral flange 14 which is bolted to said top part 4. A water inlet pipe 15 is connected to the lower end of drum 13, while a water outlet pipe 16 is connected to the top of the drum 13. A casing or hot air drum 17 seats upon the top part 6 and has an opening through which the upper end of the water drum 13 projects, so as to support said upper end of the water drum. Hot air outlets 18 are provided on the top of the hot-air drum 17.

The top part 4 is provided with a series of spaced bosses 19 which engage the lower ends of a series of vertical tubular members 20, which latter surround the water drum 13 in spaced relation to the latter. A circular manifold 21 surrounds the upper end of the said water drum 13, and is connected to the upper ends of the tubular members 20, the manifold having an outlet 4" which leads to the chimney and which draws off the products of combustion from the gas burners.

Arranged within each of the tubular members 20 is a water coil 22, the lower end of which is connected at 23 to the lower end of the water drum 13, while its upper end is connected at 24 to the upper end of the said drum, the upper ends of the pipes of which the coils are formed extending through the manifold so as to obtain the benefit of all of the heat which may enter the manifold.

Secured to the water drum 13 about midway of the length of the latter is a circular deflector plate 25 which is horizontally disposed and provided with openings through which the tubular members 20 pass. The top part 6 is provided with an opening 26 which surrounds all of the tubular members and constitutes an air flue.

Air is taken in through the pipe P into the air chamber 2, and thence passes upwardly past the burner tubes or casings 11, and strikes the top part 6, and thence passes through the center opening 26 of said top part, and strikes the deflector plate 25, and is then taken off by the outlets 18. By providing a top part 6 which inclines toward the central opening 26 thereof, or which is somewhat conical in form, it will be apparent that the air will thus be directed up in contact with the tubular members 20, which are heated on their interiors by the heat arising from the gas burners 12, and will be heated accordingly. The deflector 25 acts to impart a tortuous path of travel to the air, thus more effectively heating the same.

By disposing the lower ends of the water coil containing tubes or casings 20, at the inner ends of the gas burners 12, it will be evident that the heat will thus pass directly up through the casings 20, and will heat the coils so as to cause the water within the water drum 13 to be heated and circulate. Moreover, the lower end of the water drum 13 is projected downwardly so as to aline with the burners 12, and thus be exposed to the direct action of the burners. Since the water coil containing tubes 20 surround the water drum 13, it will be apparent that heat radiating from the tubes 20 will also heat the water in said drum, the parts, as above stated, being so combined and related that they collectively and mutually contribute to quickly and effectively heat the air and water.

Having thus described my invention, I claim as new and desire to secure by Letters Patent:

1. In a heater, a base having an air chamber, a supporting element on the base embodying inner and outer rings, a flanged top for the inner ring, a ring engaged with the outer ring, a top part having a central opening on the last named ring, a hot air drum on the last named top part, gas burners connected to the last-named ring and to the flange of said top part, a water drum connected to the top part and having its lower end extending below said last named top part and arranged to aline with said burners, a manifold surrounding the upper part of the water drum, a series of open-ended tubes connected to the manifold and to the flanged top part and projecting through the opening in the last named top part and surrounding the water drum, a water coil in each tube connected at its lower end to the water drum and at its upper end having a part extending through the manifold and connected to the upper end of the water drum, and a deflector on the water drum having openings through which the tubes extend, the deflector terminating in spaced relation to the first named drum.

2. In a heater, the combination of a base, a hollow supporting element thereon having an opening in its top, a hot air drum mounted upon said element, a water drum disposed within said air drum, a plurality of open-ended vertical tubes surrounding said water drum, said water drum and said tubes projecting at their lower ends through said opening, a plurality of gas burners disposed within said element and discharging adjacent the projecting ends of said water drum and said tubes, a manifold surrounding the upper portion of said water drum and having the upper ends of said tubes connected to it, and a water coil in each tube having its lower end connected to the lower portion of the water drum, each coil being provided at its upper end with a part which projects through said manifold and is connected to the upper portion of said water drum.

3. In a heater, the combination of a base, a hollow supporting element thereon having an opening in its top, a hot air drum mounted upon said element, a water drum disposed within said air drum, a plurality of open-ended vertical tubes surrounding said water drum, said water drum and said tubes projecting at their lower ends through said opening, a plurality of gas burners disposed within said element and discharging adjacent the projecting ends of said water drum and said tubes, a manifold surrounding the upper portion of said water drum and having the upper ends of said tubes connected to it, a water coil in each tube having its lower end connected to the lower portion of the water drum, each coil being provided at its upper end with a part which projects through said manifold and is connected to the upper portion of said water drum, and a deflector on said water drum having openings through which said tubes pass, said deflector terminating in spaced relation to said air drum.

In testimony whereof I have signed my name to this specification in the presence of two subscribing witnesses.

ERNEST C. BARTH.

Witnesses:
 ADA E. HAGERTY,
 J. A. MILLER.